(12) United States Patent
Rudd et al.

(10) Patent No.: US 8,991,256 B2
(45) Date of Patent: Mar. 31, 2015

(54) METHOD FOR DETERMINING SPEED OF A SIGNAL SPECIES IN A MEDIUM AND ASSOCIATED APPARATUS

(75) Inventors: Wayne Rudd, Ponteland (GB); Allison Mason, legal representative, Ponteland (GB); Laurie Linnett, East Lothian (GB)

(73) Assignee: Bios Developments Limited, Norfolk (GB)

( * ) Notice: Subject to any disclaimer, the term of this patent is extended or adjusted under 35 U.S.C. 154(b) by 385 days.

(21) Appl. No.: 13/386,817

(22) PCT Filed: Jul. 23, 2010

(86) PCT No.: PCT/GB2010/001401
§ 371 (c)(1),
(2), (4) Date: Jun. 7, 2012

(87) PCT Pub. No.: WO2011/010108
PCT Pub. Date: Jan. 27, 2011

(65) Prior Publication Data
US 2012/0272737 A1    Nov. 1, 2012

(30) Foreign Application Priority Data

Jul. 24, 2009  (GB) .................................. 0912879.4

(51) Int. Cl.
*G01N 29/024*   (2006.01)
*G01F 1/66*     (2006.01)
(Continued)

(52) U.S. Cl.
CPC ... *G01P 5/18* (2013.01); *G01F 1/74* (2013.01); *G01P 5/245* (2013.01); *G01H 5/00* (2013.01)
USPC .......................... 73/597; 73/861.27; 73/61.49

(58) Field of Classification Search
USPC ......... 73/597, 596, 598, 602, 861.27, 861.28, 73/61.47, 61.49, 61.79
See application file for complete search history.

(56) References Cited

U.S. PATENT DOCUMENTS 3,575,050 A  *  4/1971  Lynnworth ................ 73/861.27
4,145,922 A  *  3/1979  Estrada et al. .................. 374/39
(Continued)

FOREIGN PATENT DOCUMENTS

DE   102008054257 A1   5/2009
EP       1 441 105        7/2004
(Continued)

OTHER PUBLICATIONS

Examination Report issued in the United Kingdom dated Aug. 21, 2013.
(Continued)

*Primary Examiner* — Helen Kwok
(74) *Attorney, Agent, or Firm* — Harness, Dickey & Pierce, P.L.C.

(57) ABSTRACT

Methods and apparatus for determining the speed of a signal species, such as an acoustic signal, in a multilayered medium is described. The multilayer medium, generally, has a first and second layer (e.g. oil and water), whereby first and second signals are transmitted across particular distances in the medium such that a second distance differs from a first distance, and whereby the time of flight of each signal can be used in order to determine the speed of the signals species in one or both of the first and second layer. In other words, in some cases, the speed of sound can be determined in oil and/or water, or the like.

22 Claims, 7 Drawing Sheets

(51) Int. Cl.
*G01P 5/18* (2006.01)
*G01F 1/74* (2006.01)
*G01P 5/24* (2006.01)
*G01H 5/00* (2006.01)

(56) References Cited

U.S. PATENT DOCUMENTS

| | | | | |
|---|---|---|---|---|
| 5,038,615 | A * | 8/1991 | Trulson et al. | 73/597 |
| 5,705,753 | A * | 1/1998 | Hastings et al. | 73/861.28 |
| 5,719,329 | A * | 2/1998 | Jepson et al. | 73/61.49 |
| 6,769,293 | B2 * | 8/2004 | Zanker | 73/61.79 |
| 6,823,716 | B2 * | 11/2004 | Kelner et al. | 73/24.06 |
| 7,299,697 | B2 * | 11/2007 | Siddu et al. | 73/597 |
| 7,322,245 | B2 * | 1/2008 | Gysling et al. | 73/597 |
| 7,373,808 | B2 * | 5/2008 | Zanker et al. | 73/105 |
| 7,481,114 | B2 * | 1/2009 | Lynnworth | 73/597 |
| 7,587,936 | B2 * | 9/2009 | Han | 73/152.43 |
| 8,276,431 | B1 * | 10/2012 | Latimer et al. | 73/1.86 |
| 8,694,271 | B2 * | 4/2014 | Dam | 702/48 |
| 2002/0189367 | A1 * | 12/2002 | Gomm et al. | 73/861.23 |
| 2004/0199340 | A1 | 10/2004 | Kersey et al. | |
| 2005/0034530 | A1 | 2/2005 | Han et al. | |
| 2007/0022803 | A1 | 2/2007 | DiFoggio et al. | |
| 2008/0186805 | A1 | 8/2008 | Han | |
| 2010/0111133 | A1 * | 5/2010 | Yuhas et al. | 374/30 |
| 2012/0265454 | A1 * | 10/2012 | Rudd et al. | 702/48 |

FOREIGN PATENT DOCUMENTS

| | | |
|---|---|---|
| GB | 1 603 366 | 5/1978 |
| GB | 2 424 072 | 9/2006 |
| JP | 11-281428 A | 10/1999 |
| WO | WO-9314382 A1 | 7/1993 |
| WO | WO 98/48140 | 10/1998 |
| WO | WO-0046575 A1 | 8/2000 |

OTHER PUBLICATIONS

Examination Report issued in the United Kingdom dated Feb. 4, 2013.

International Search Report, date of mailing Nov. 4, 2010.

* cited by examiner

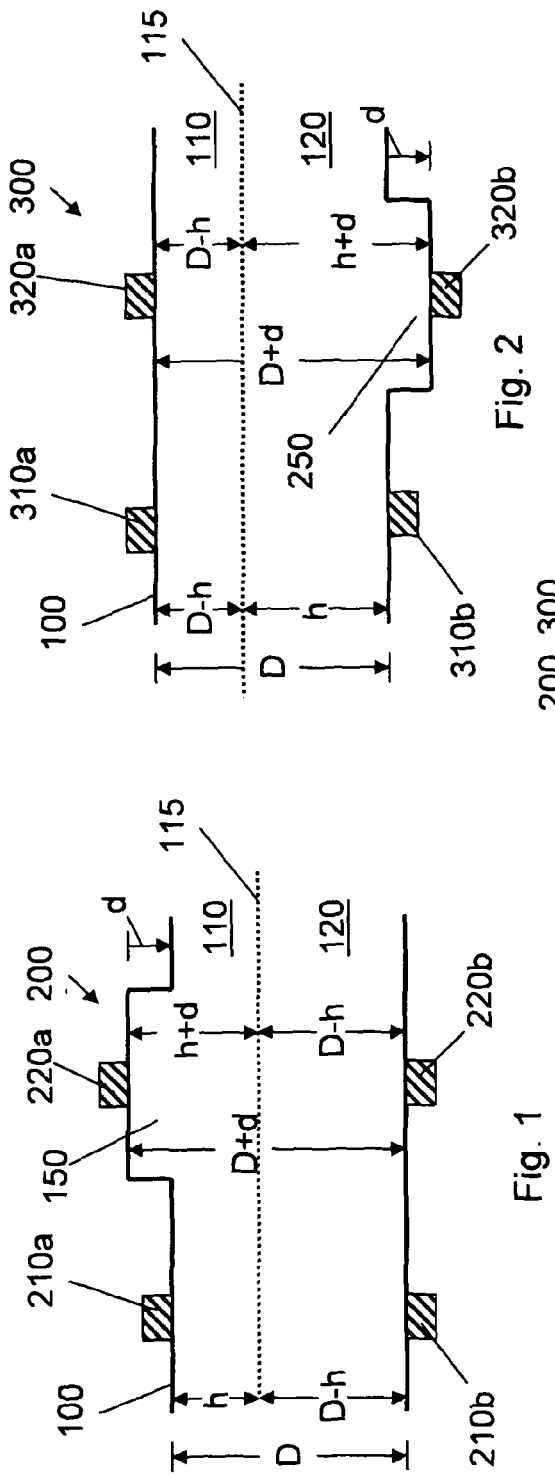
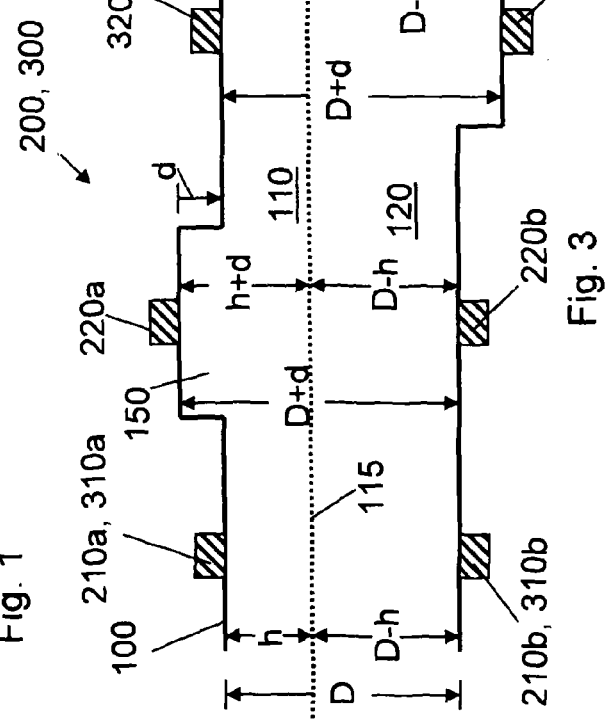

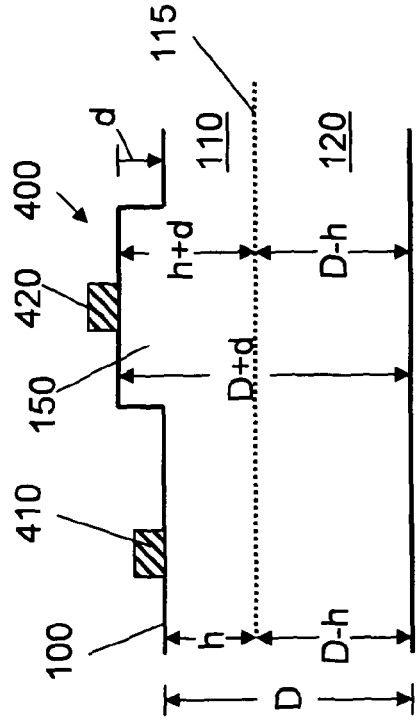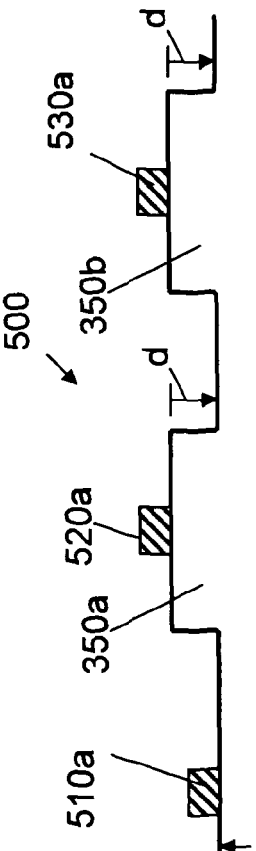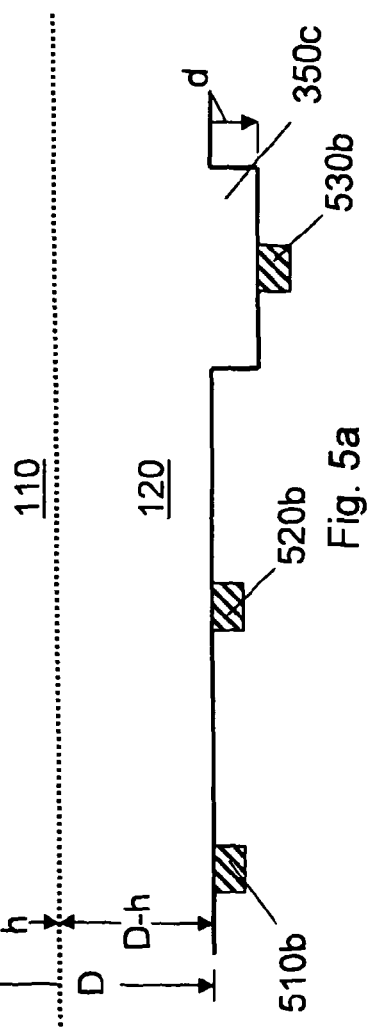

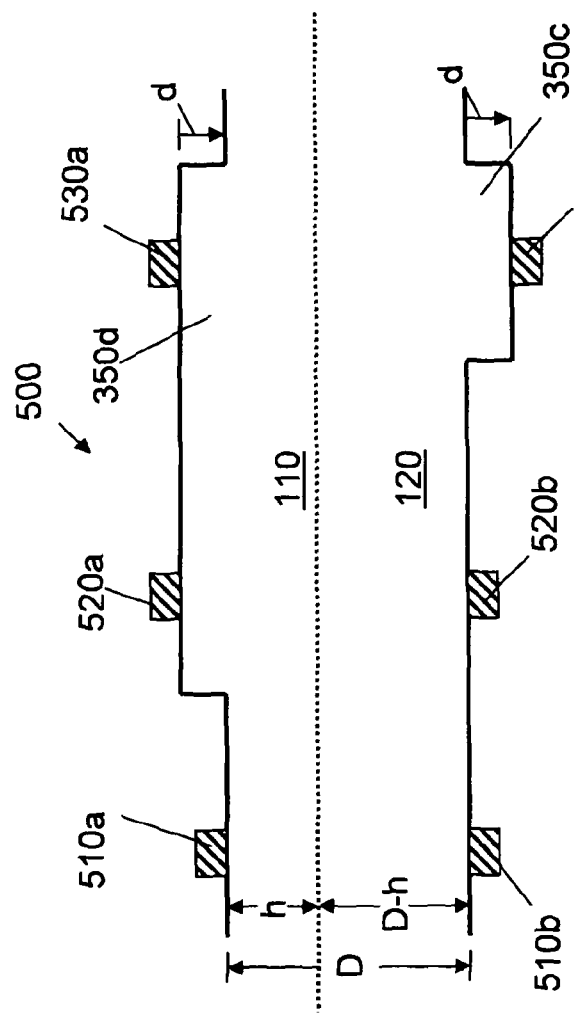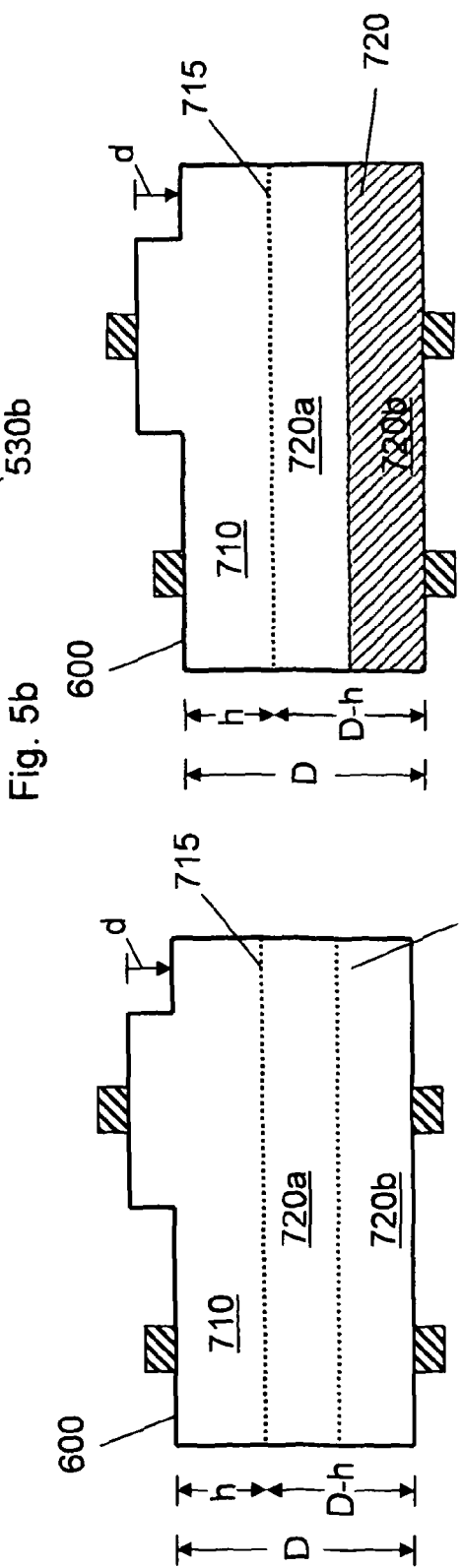
Fig. 5b
Fig. 6a
Fig. 6b

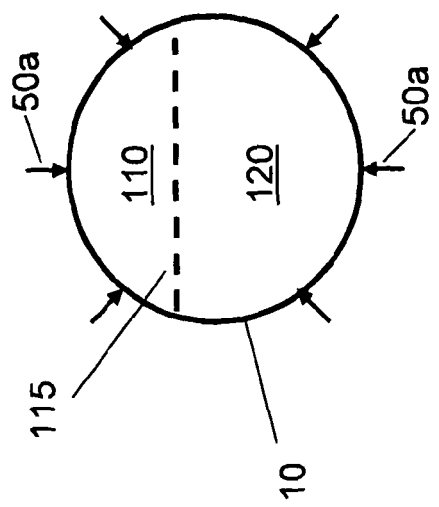
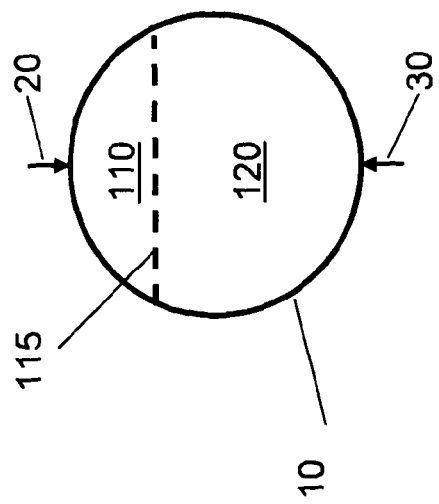
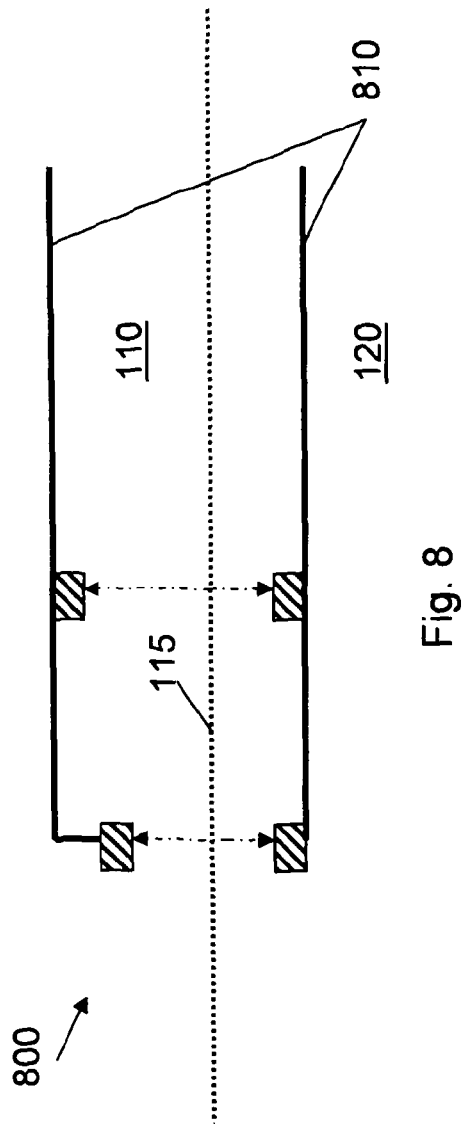

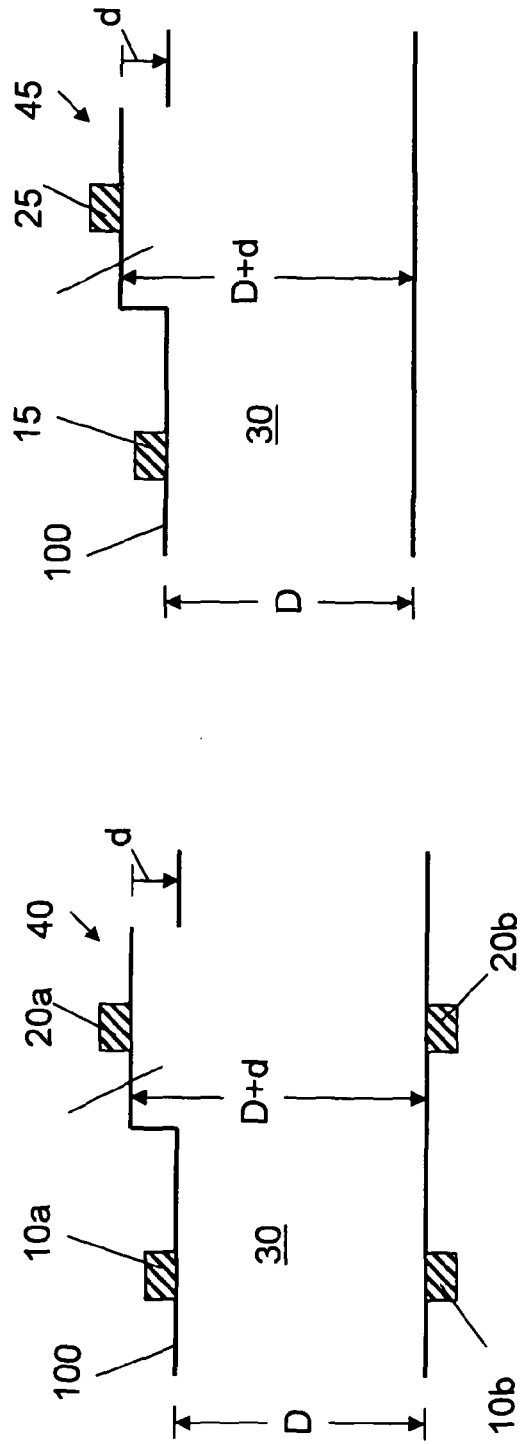
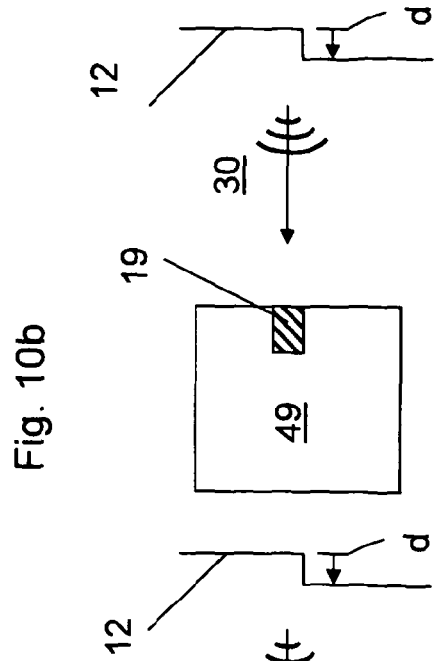
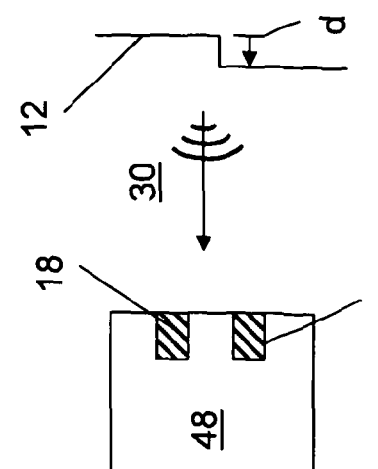
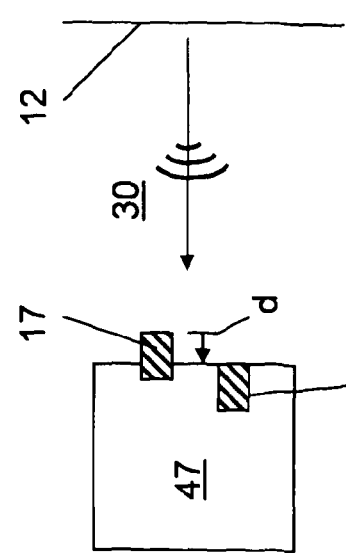
Fig. 10a
Fig. 10b
Fig. 10c
Fig. 10d
Fig. 10e

METHOD FOR DETERMINING SPEED OF A SIGNAL SPECIES IN A MEDIUM AND ASSOCIATED APPARATUS

TECHNICAL FIELD

The invention relates to a method for determining the speed of a signal species in a medium, and associated apparatus. In particular, the invention relates to a method for determining the speed of a signal species in a medium in a conduit, tubular, container, pipeline, reservoir, or the like.

BACKGROUND

In certain industries it is desirable to measure features or properties of a medium, such as properties of solids, liquids or gases (or combinations thereof). Such mediums may be provided in a container, pipeline, reservoir, conduit, or the like. An example of a medium might be a coolant in a cooling system conduit, or a flow of hydrocarbons in a transportation/production pipeline. In some instances, mediums can comprise two or more layers, each layer being a different density and/or different phase. Such mediums may be considered to be multi-layered.

An example of a multi-layered medium may be hydrocarbon gas and oil, provided in a pipeline, in which the gas and oil are provided as different layers due to the difference in their relative densities. In an alternative example of a multi-layered medium, a conduit comprising a deposited build-up of matter on the inner wall may be considered to be a first layer, while the material passing through the conduit may be considered to be a second layer of the multi-layer medium.

It can be desirable to make measurements to evaluate/estimate properties of mediums (multi-layered or otherwise), such as the flow rate, deposition thickness, etc. In order to do so, signals may be propagated into, or through, the medium (or multi-layered medium). To derive useful information from such signals, an accurate appreciation of the speed of such a signal in the medium, and in each layer, is looked-for (e.g. an accurate appreciate of the speed of an acoustic signal propagating in a layer or medium). Different signal species may be used depending upon the measurement. Signal species may include species such as acoustic signals, electromagnetic signals, optical signals, etc.

The speed of such signals species can be dependent on many factors. For example, the speed of an acoustic signal passing through a medium will vary depending on the density of that medium, which will vary depending upon the temperature of that medium. Similarly, varying refractive indices of a particular media will vary the speed of a propagating optical signal.

In many cases, the speed of a signal species in a medium is either guessed by having a prior knowledge of the medium in question, or is estimated or evaluated by using secondary information, such as temperature measurements and look-up tables (e.g. measuring the temperature and comparing this with known data for that particular medium at that temperature). In each case, making inaccurate presumptions about the medium in question can provide inaccurate results, and thus an inaccurate speed of a signal propagating in that medium is provided. The requirement to make various assumptions typically requires complex calculations to be performed which can significantly increase processing time, limiting the capabilities of existing techniques.

Such inaccurate measurement can often be provided in the oil and gas exploration and production industry, such as when monitoring the fluid flow in a multi-fluid/multi-layered pipeline, which can result in serious processing hazards, and/or an undesirable increase in operational costs.

SUMMARY

According to a first aspect of the invention there is provided a method for determining the speed of a signal species in at least one of a first and second layer of a multi-layer medium, comprising:

transmitting a first signal across a first known distance through a first and second layer;

determining the time of flight of the first signal travelling across the first known distance;

transmitting a second signal across a second known distance through the first and second layers, the second signal being of the same signal species as the first signal, and wherein the second known distance differs from the first known distance;

determining the time of flight of the second signal travelling across the second known distance; and evaluating the speed of the signal species through at least one of the first and second layers by using the time of flight of the first and second signals and the first and second known distances.

The first and second layers may comprise adjacent layers. The first and second layers may be stratified, or substantially stratified. An interface, interface layer, boundary layer or the like, may be defined between the first and second layers. The first and second layers may be substantially continuously stratified such that said layers are of a substantially equivalent dimension in at least one direction, such as a direction of an interface region between the first and second layers. The first and second layers may be discretely stratified. In this arrangement one of the first and second layer may be at least partially contained within the other of the first and second layer. For example, one of the first and second layers may comprise a bubble, core, slug, droplet, bead, ball or the like contained within the other of the first and second layer.

The interface region may comprise an interface layer, boundary layer or the like. The interface region may comprise a region of emulsion. The interface region may comprise a region of gas and liquid foam defined between the first and second layers.

The distance travelled by the first and second signals transmitted through the second layer may be similar, or roughly the same, so as to provide for evaluating the speed of the signal species through the first layer. The distance travelled by the first and second signals transmitted through the first layer may be similar, or roughly the same, so as to provide for evaluating the speed of the signal species through the second layer. The distance travelled by the first and second signals transmitted through the first layer may be the same so as to provide for evaluating the speed of the signal species through the second layer. The distance travelled by the first and second signals transmitted through the second layer may be the same so as to provide for evaluating the speed of the signal species through the first layer.

The method may comprise transmitting a third signal across a third known distance through the first and second layers. The third signal may be of the same signal species as the first and second signals. The third known distance may differ from at least one of the first and second known distances. The method may comprise determining the time of flight of the third signal travelling across the third known distance.

The third known distance may differ from at least one of the first and second known distances. The distance of at least two of the first, second and third signals transmitted through the second layer may be similar, or roughly the same. The distance of at least two of the first, second and third signals transmitted through the first layer may be similar, or roughly the same. The distance of at least two of the first, second and third signals transmitted through the second layer may the same. The distance of at least two of the first, second and third signals transmitted through the first layer may be the same. Such configurations may provide for evaluating the speed of the signal species through one or both of the first layer and the second layer.

The second and third known distances may be similar, roughly the same, or the same. The second and third known distances may be different. The first, second and third known distances may be different.

One or more of the first, second and third signals may be transmitting twice (or more) in order to provide for evaluating the speed of a signal species. For example, the method may comprise transmitting a first signal and a second signal in order to evaluate the speed of a signal species in one of the first and second layers, and transmit a (further) first signal and third signal in order to provide for evaluating the speed of a signal species in the other of the first and second layers.

Known distances that are similar, or roughly the same, may include distances that are the same, or substantially the same. The known distances may comprise one or more measured known distances, estimated known distances, evaluated known distances, approximated known distances, or the like. Distances may include configured known distances.

That is to say that, in some instances the distances may be measured prior, during, or after transmitting of at least one of the first, second and third signals, or may be estimated, evaluated, or approximated. In further instances, the signals may be transmitted a configured distances. For example, the method may comprise using movable/adjustable apparatus to provide a configured known distance.

The multi-layer medium may comprise a single phase. The multi-layer medium may comprise multiple phases. The multi-layer medium may comprise any one or combination of: solid, liquid and/or gas component phase. The first layer may comprise any one, or more, of solid, liquid or gas component phases. The first layer may comprise a single component phase. The first layer may comprise multiple component phases. The first layer may comprise different or the same component phases. The first layer may comprise water, oil, hydrocarbon gas, hydrates, asphaltenes, etc. The second layer may comprise any one, or more, of solid, liquid or gas component phases. The second layer may comprise a single component phase. The second layer may comprise multiple component phases. The second layer may comprise different or the same component phases. The second layer may comprise water, oil, hydrocarbon gas, hydrates, asphaltenes, etc.

The first layer and the second layer may comprise different or the same component phases.

At least one of the first and second layer may comprise two or more sub-layers, such as three, four, five, ten, twenty sub-layers, or any number therebetween. Each sub-layer may be adjacent, such as being adjacently stratified, or the like. Each sub-layer may be provided with a region of emulsion, foam, etc. The speed of a signal species in a layer comprising sub-layers may be determined to be the average speed of a signal through the cumulative sub-layers.

The method may comprise comparing the difference in the time of flight between particular signals in order to provide for evaluating the speed of a signal species in at least one of the first and second layer. For example, the method may comprise comparing the difference in the time of flight between the at least two of the first, second and third signal in order to provide for evaluating the speed of a signal species in at least one of the first and second layers. The method may comprise determining/evaluating the difference in the time of flight between at least two of the first, second and third signal in order to provide for evaluating the speed of a signal species in at least one of the first and second layer.

The method may comprise providing one or more recesses so as to provide for different distances between the known distances. The method may comprise providing one or more recesses so as to differentiate between the known distances. The one or more recesses may be provided with a conduit, a pipeline, or the like. A common recess may provide for different distances between two or more known distances and one or more further known distances. That is to say that a common recess may provide for differentiating between two or more known distances and one or more further known distances.

At least one of the first and second layers of the multi-layer medium may be in motion, for example flowing. In circumstances when both the first and second layer are in motion, the motion may be in the same or in opposite directions. The motion may be at the same, or differing speeds.

One, some or all of the signals may be transmitted through some, or all, of the first and second layer. For example, one, some or all of the signals may be transmitted through, such as entirely through, or across, such as entirely across, a conduit, container, reservoir, pipeline, or the like, comprising the multi-layered medium.

One, some or all of the signal may be transmitted and received at differing regions of a conduit, container, reservoir, etc., such as opposing sides, or the like. One, some or all of the signals may be transmitted and received at diametrically opposing sides of a conduit, container, reservoir, etc. The method may comprise transmitting and receiving one, some or all of the signals across a conduit, container, reservoir, etc., such that the signals are transmitting and received at the same side of the conduit, container, reservoir, etc. The method may comprise transmitting one, some, or all of the signal across a conduit, container, reservoir, etc., and receiving reflected signals. The reflected signals may have been reflected from different regions of a conduit, container, reservoir, etc., such as an opposing side thereof.

One or more of the signals may be transmitted from transmitters implanted, submerged, immersed, embedded, etc., in the multi-layered medium (e.g. transmitters may be immersed in a multi-layered medium in a reservoir, or the like). That is to say that one or more of the signals may be transmitted and received (and/or reflected and received) from regions within a multi-layered medium, such as a medium in a conduit, container, reservoir, or the like.

Two or more of the signals may be transmitted simultaneously. The method may comprise transmitting two or more of the signals substantially simultaneously. The method may comprise transmitting two or more of the signals sequentially (e.g. differing by 1 µs, 1 ms, 1 sec, 1 minute, or any time interval therebetween). The method may comprise evaluating the speed of a signal species in the first and second layers of the medium simultaneously, or substantially simultaneously.

The signal species may comprise one or more of acoustic signals, such as ultrasonic signals; electromagnetic signals, such as radio frequency signals; optical signals, etc.

The method for determining speed of a signal species in a one or more of a first and second layer may comprise using transducers configured to transmit one or more of: acoustic signals, such as ultrasonic signals; electromagnetic signals, such as radio frequency signals; optical signals, etc. The method for determining speed of a signal species in a one or more of a first and second layer may comprise using transducers configured to receive one or more of: acoustic signals, such as ultrasonic signals; electromagnetic signals, such as radio frequency signals; optical signals, etc. The method may comprise using transducers configured to transmit and receive such signals (so-called transceivers).

The method may comprise determining the speed of a signal species in at least one of the first and second layer in a multi-layer medium in a substantially horizontal conduit, such as a horizontal conduit (e.g. a horizontal pipeline). The method may comprise determining the speed of a signal species by transmitting/receiving signals substantially perpendicular to a plane of an interface region provided by adjacent first and second layers.

The method may comprise transmitting signals at a rate of 0.01, 0.1, 1, 10, 100, 1000, 10000 signals per second (i.e. Hz), or any number therebetween.

The method may comprise providing for transmitting a signal, determining a time of flight of a signal and/or evaluating the speed of a signal remotely (e.g. remotely controlled at a distance from a conduit, etc., carrying the first and second layer).

For example, the method may use remote communication with a location, such as a conduit, etc., in order to provide the method. The remote communication may be wired, wireless, or combination thereof. Wireless communication may include be such as those provided by wireless communication (e.g. Radio Frequency, IEEE 802 family (e.g. WiFi, WiMax, etc.) and/or and mobile cellular communication (GSM, UMTS, LTE, etc.), BlueTooth, ZigBee, etc.).

The method may use an evaluated speed of a signal species for other measurements of a multi-layer medium (e.g. using the speed of a signal species so that it is possible to determine other parameters of a medium). The method may provide an evaluated speed of a signal species to further apparatus. The further apparatus may be configured to use the evaluated signal speed and for making measurements of a medium in a conduit, or the like. The method may use the evaluated speed of a signal in a medium so as to provide for calibration, such as calibration of a further apparatus.

The method may comprise using the evaluated speed of the signal species through at least one of the first and second layer so as to determine the material properties of the first and/or second layer. For example, the speed of the signal species through a particular layer (e.g. the first layer) may indicate that that particular layer is a gas, rather than a liquid or a solid. The speed of the signal species through a particular layer may indicate that that particular layer is a particular substance, such as oil, rather than a different substance, such as water. The speed of the signal species through a particular layer may indicate that that particular layer is at a particular temperature and/or density. For example, it may be known (or proposed, guessed, or the like) that the first layer is water. Based on the speed of a signal species through the water, the method may be able to establish a particular temperature and/or density.

The method may be used to allow for making further measurements in, or with, multi-phase flow metering, such as a multi-phase flow meter for determining the flow of multiple phases.

The method may comprise accounting for a conduit's, container's, or the like, wall thickness when evaluating the speed of a signal species in at least one of a first and second layer in a multi-layer medium. The method may comprise accounting for a conduit's, etc., wall thickness by approximating/using the time of flight of a signal to pass through a wall of the conduit, etc.

The method may be for determining the speed of signal species in at least one of a first layer and second layer in a multi-layer medium in a pipeline, such as an oil and gas exploration/transportation pipeline. The method may be for determining the speed of signal species in at least one of a first layer and second layer in a multi-layer medium in a coolant pipeline, such as a coolant pipeline provided in power station, or the like. The method may be for determining the speed of signal species in at least one of a first and second layer in medical apparatus, or the like. The method may be for determining the speed of a signal species in at least one of a first and second layer of a laboratory apparatus.

According to a second aspect of the invention, there is provided apparatus for determining the speed of a signal species in at least one of a first and second layer of a multi-layer medium, comprising:

a first transmitter and first receiver, configured to transmit and receive a first signal across a first known distance through a first and second layer;

a second transmitter and second receiver, configured to transmit and receive a second signal across a second known distance through a first and second layer; the apparatus being configured to transmit/receive a second signal of the same signal species as a first signal, wherein the second known distance differs from the first known distance;

the apparatus further configured to determine the time of flight of a first signal travelling across the first known distance and the time of flight of a second signal across the second known distance, and to evaluate the speed of a signal species through at least one of a first and second layer by using the time of flight of a first and second signal and the first and second known distances.

The apparatus may be configured such that the distance travelled by a first and second signal transmitted through a second layer may be similar, or roughly the same, so as to provide for evaluating the speed of the signal species through a first layer. The apparatus may be configured such that the distance travelled by first and second signals transmitted through a first layer may be similar, or roughly the same, so as to provide for evaluating the speed of the signal species through a second layer. The apparatus may be configured such that the distance travelled by a first and second signal transmitted through a first layer may be the same so as to provide for evaluating the speed of the signal species through a second layer. The apparatus may be configured such that the distance travelled by a first and second signal transmitted through a second layer may be the same so as to provide for evaluating the speed of the signal species through a first layer.

The apparatus may comprise a third transmitter and third receiver, configured to transmit and receive a third signal across a third known distance through a first and second layer. The apparatus may be configured to determine the time of flight of the third signal travelling across the third known distance. The third signal may be of the same signal species as a first and second signal. The third known distance may differ from at least one of the first and second known distance such that the distance of at least two of the first, second and third signals transmitted through the second layer may be similar, or roughly the same. The third known distance may differ from at least one of the first and second known distance such that the distance of at least two of the first, second and third signals transmitted through the first layer may be similar, or roughly the same. Such a configuration may provide for evaluating the speed of the signal species through at least one of the first layer and second layer.

The second and third known distances may be the similar, roughly the same, or the same. The second and third known distances may be different. The first, second and third known distances may be different.

The apparatus may be configured to transmit twice (or more) one or more of the first, second and/or third signals in order to provide for evaluating the speed of a signal species. For example, the apparatus may be configured to transmit a first signal and a second signal in order to evaluate the speed of a signal species in a particular layer, and transmit a (further) first signal and third signal in order to provide for evaluating the speed of a signal species in the other layer. The further first signal may be transmitted/received by the same transmitter/receiver as the initial first signal, or by a further transmitter/receiver.

The apparatus may be configured such that distances that are similar, or roughly the same, may include distances that are the same, or substantially the same. The apparatus may be configured such that the known distances are estimated, evaluated, approximated, measured, or the like.

The apparatus may be configured to provided configured (or configurable) known distances. For example, the apparatus may be configured such that one or more of the first, second and third transmitters are movable to provide at least one of a configured first, second and third known distance. The apparatus may be configured such that one or more of the first, second and third receivers are movable to provide at least one of a configured first, second and third known distance. Both transmitter and receiver may be movable so as to provide configured known distances.

The apparatus may be configured for use with first and second layers that are adjacent layers. An interface, interface layer, boundary layer, or the like, may be defined by a region between the first and second layers. A region of emulsion and/or foam may be defined between the first and second layers. The first and second layers may be stratified, or substantially stratified.

The apparatus may be configured for use with a multi-layer medium having any one or combination of a solid, liquid or gas component phase. The apparatus may be configured for use with a multi-layered medium having a substantially single component phase. The apparatus may be configured for use with a multi-layered medium having a different or the same component phases.

At least one of the first and second layers may be any one, or more, of a solid, a liquid or a gas, including water, oil, hydrocarbon gas, hydrates, asphaltenes, etc. At least one first and second layer may comprise a fluid.

At least one of the first and second layer may comprise two or more sub-layers, such as three, four, five, ten, twenty sub-layers, or any number therebetween. Each sub-layer may be adjacent, such as being adjacently stratified, or the like (e.g. each sub-layer may define an interface, region of emulsion, etc. therebetween). The speed of a signal species in one or more of the first and second layer may be determined to be an average speed of signal through the cumulative sub-layers of that layer.

The known distances of the apparatus may comprise one or more measured known distances, estimated known distances, evaluated known distances, approximated known distances, or the like.

The apparatus may be configured to compare the difference in the time of flight between particular signals in order to provide for evaluating the speed of a signal species in a first/second layer. For example, the apparatus may be configured to compare the difference in the time of flight between two or more of the first, second and third signals in order to provide for evaluating the speed of a signal species in at least one of the first and second layer. The apparatus may be configured to determine/evaluate the difference in the time of flight between particular signals, such as two or more of the first, second and third signal, in order to provide for evaluating the speed of a signal in one or more of the first and second layer.

The apparatus may comprise one or more recesses. The one or more recesses may provide for different distances between the known distances. The one or more recesses may be provided with a conduit, pipeline, container, reservoir, or the like. A common recess may provide for different distances between two or more known distances and one or more further known distances.

The apparatus may be configured so as to determine the speed of a signal species when at least one of the first and second layers of the multi-layer medium may be in motion, for example flowing. In circumstances when both the first and second layers are in motion, the motion may be in the same or in opposite directions. The motion may be at the same, or differing speeds.

The apparatus may be configured such that one, some or all of the signals may be transmitted through some, or all, of the first and second layer. For example, the apparatus may be configured such that one, some or all of the signals may be transmitted through, or across, a conduit, container, reservoir, or the like, comprising a multi-layered medium.

The apparatus may be configured such that one, some or all of the signals may be transmitted and received at differing regions of a conduit, container, reservoir, etc., such as opposing sides, or the like. One, some or all of the signals may be transmitted and received at opposing sides of a conduit, container, reservoir, etc. The apparatus may be configured to transmit and receive one, some or all of the signals across a conduit, container, reservoir, etc., such that the signals are transmitted and received at the same side of a conduit, container, reservoir, etc. The apparatus may be configured to transmit one, some, or all of the signals across a conduit, container, reservoir, etc., and receive reflected signals. The reflected signals may have been reflected from different regions of the apparatus, conduit, container, reservoir, etc., such as an opposing side thereof.

The apparatus may be comprised with a conduit, container, pipeline, or the like. The apparatus may be attachable/detachable with a conduit, container, pipeline, etc. The apparatus may be mountable/demountable with a conduit, container, pipeline, etc. The apparatus may be configured for attachment/mounting with the outer side of a conduit, container, pipeline, and/or the inner side of a conduit, pipeline, container, etc. The apparatus may be configured to be retro-fit to a conduit, container, pipeline, etc. The apparatus may be provided with a conduit for use as a modular component of a pipeline, and/or further conduit. For example, the apparatus may be comprised with a portion of pipeline, conduit, flow circuit, or the like, for use with other modular parts of a pipeline, conduit, etc. Such other modular parts may not comprise apparatus, but merely act to complete a flow circuit, or the like.

The apparatus may be configured such that one or more signals may be transmitted from transmitters implanted, or embedded, in the multi-layered medium, which may be a multi-layered medium in a conduit, reservoir, pipeline, etc. That is to say that the apparatus may be configured such that one or more signals might be transmitted and received (and/or reflected and received) from regions within a medium, such as a medium in a conduit, pipeline, reservoir, or the like. The apparatus may comprise one or more locators to allow location of the apparatus within a medium.

The apparatus may be configured such that two or more of the signals may be transmitted simultaneously, substantially simultaneously, or the like. The apparatus may be configured to transmit two or more of the signals sequentially (e.g. differing by 1 μs, 1 ms, 1 sec, 1 minute, or any time interval therebetween). The apparatus may be configured to evaluate the speed of a signal species in the first and second layers of the medium simultaneously, or substantially simultaneously.

The signal species may comprise one or more of acoustic signals, such as ultrasonic signals; electromagnetic signals, such as radio frequency signals; optical signals, etc.

The apparatus may comprise transducers configured to transmit one or more of: acoustic signals, such as ultrasonic signals; electromagnetic signals, such as radio frequency signals; optical signals, etc. The apparatus may comprise transducers configured to receive one or more of: acoustic signals, such as ultrasonic signals; electromagnetic signals, such as radio frequency signals; optical signals, etc. The apparatus may comprise transducers configured to transmit and receive such signals (so-called transceivers).

The apparatus may be configured to determine the speed of a signal species in at least one of the first and second layer in a multi-layer medium in a substantially horizontal conduit, such as a horizontal conduit (e.g. a horizontal pipeline). The apparatus may be configured to determine the speed of a signal species by transmitting/receiving signals substantially perpendicular to a plane of an interface region provided by adjacent first and second layers.

The apparatus may be configured to transmit signals at a rate of 0.01, 0.1, 1, 10, 100, 1000, 10000 signals per second (i.e. Hz), or any number therebetween.

The apparatus may be configured to provide for transmitting a signal, determining a time of flight of a signal and/or evaluating the speed of a signal remotely (e.g. remotely controlled at a distance from a conduit, etc., carrying the first and second layer).

For example, the apparatus may be configured for remote communication with a location, such as a conduit, etc., in order to provide for determining the speed of a signal species in at least one of a first and second layer. The remote communication may be wired, wireless, or combination thereof. Wireless communication may include be such as those provided by wireless communication (e.g. Radio Frequency, IEEE 802 family (e.g. WiFi, WiMax, etc.) and/or and mobile cellular communication (GSM, UMTS, LTE, etc.), BlueTooth, ZigBee, etc.).

The apparatus may be configured to evaluate speed of a signal species for other measurements of the multi-layer medium(s), (e.g. providing the speed of a signal species so that it is possible to determine other parameters of the medium). The apparatus may be configured to provide an evaluated speed of a signal species to further apparatus. The further apparatus may be configured to use the evaluated signal speed and for making measurements of the medium(s) in conduit, container, pipeline, reservoir, or the like. The apparatus may be configured to use the evaluated speed of a signal in medium(s) so as to provide for calibration, such as calibration of a further apparatus.

The apparatus may be configured to use the evaluated speed of a signal species through at least one of the first and second layer so as to determine the material properties of the first and/or second layer. For example, the speed of the signal species through a particular layer (e.g. the first layer) may indicate that that particular layer is a gas, rather than a liquid or a solid. The speed of the signal species through a particular layer may indicate that that particular layer is a particular substance, such as oil, rather than a different substance, such as water. The speed of the signal species through a particular layer may indicate that that particular layer is at a particular temperature and/or density. For example, it may be known (or proposed, guessed, or the like) that the first layer is water, and that based on the speed of a signal species through the water, that it has a particular temperature and/or density.

The apparatus may be configured to allow for making further measurements in, or with, multi-phase flow metering, such as a multi-phase flow meter for determine the flow of multiple phases. The apparatus may be comprised with a multiphase flow meter. The apparatus may be configured for direct communication with a multi-phase flow meter.

The apparatus may be configured to account for a conduit wall thickness when evaluating the speed of a signal species in at least one of a first and second layer in a multi-layer medium. Accounting for a conduit wall thickness may be by approximating/using the time of flight of a signal to pass through a wall of the conduit, or the like.

The apparatus may be configured to determine the speed of signal species in at least one of a first layer and second layer in a multi-layer medium in a pipeline, such as an oil and gas exploration/transportation pipeline. The apparatus may be configured to determine the speed of signal species in at least one of a first layer and second layer in a multi-layer medium in a coolant pipeline, such as a coolant pipeline provided in power station, or the like, in medical apparatus, or the like, in laboratory apparatus.

The apparatus may be comprised with exploration/transportation pipeline, coolant pipeline, medical apparatus, laboratory apparatus, or the like.

According to a third aspect of the invention there is a method for determining the speed of signals in a first medium in a multi-medium in a conduit, the multi-medium comprising at least a first medium and a second medium, the method comprising:
  transmitting a first signal across a first known distance of a conduit carrying a multi-medium having at least a first and second medium;
  receiving the first signal and determining the time of flight of the first signal;
  transmitting a second signal across a second known distance of the conduit carrying the multi-medium, the second known distance differing from the first known distance by a first margin;
  receiving the second signal and determining the time of flight of the second signal; and
  evaluating the speed of the signals in the first medium by using the time of flight of the first and second signals and the first and second known distances.

The method may be for additionally determining the speed of a signal in the second medium in a multi-medium in a conduit, wherein the method further comprises:
  transmitting a third signal across a third known distance of the conduit carrying the multi-medium flow, the third known distance differing from first known distance by a second margin; wherein
  the first margin provides the difference in signal path length between the first and second signals in the first medium, and second margin provides the difference in signal path length between the first and third signals in the second medium
  receiving the third signal and determining the time of flight of the third signal; and evaluating the speed of the signal in the second medium by using the time of flight of the first signal and the third signal, and the first known distance and third known distance.

The method may additionally be for determining the speed of a signal in the second medium in a multi-medium in a conduit, wherein the method further comprises:
transmitting a third signal across a third known distance of the conduit carrying the multi-medium flow, the third known distance differing from first known distance and differing from the second known distance by a second margin; wherein
the first margin provides the difference in signal path length between the first and second signals in the first medium, and second margin provides the difference in signal path length between the first and third signals in the first medium and second medium
receiving the third signal and determining the time of flight of the third signal; and
evaluating the speed of the signal in the second medium by using the time of flight of the second signal and the third signal, and the second known distance and third known distance.

The method may comprise using estimated known distances. The method may comprise using approximated known distances. The method may comprise using evaluated known distances.

The medium(s) may be any one of a solid, a liquid or a gas, including water, oil, hydrocarbon gas, hydrates, asphaltenes, etc. The medium(s) may be fluid(s).

According to a fourth aspect there is provided a measurement device for an oil and gas pipeline, or a measurement device for medical measurement, the measurement device comprising an apparatus according to any of the second aspect.

The measurement device may be a multiphase flowmeter.

According to a fifth aspect of the invention there is a method for determining the speed of a signal species of one or more of a first fluid and a second fluid in a multi-fluid in a conduit, the method comprising:
transmitting a first signal across a first known distance through a first and second fluid;
determining the time of flight of the first signal travelling across the first known distance;
transmitting a second signal across a second known distance through the first and second fluid, the second signal being of the same signal species as the first signal, and wherein the second known distance differs from the first known distance;
determining the time of flight of the second signal travelling across the second known distance; and
evaluating the speed of the signal species through at least one of the first and second fluid by using the time of flight of the first and second signals and the first and second known distances.

The distance travelled by the first and second signals transmitted through the second fluid may be similar, or roughly the same, so as to provide for evaluating the speed of the signal species through the first fluid. The distance travelled of the first and second signals transmitted through the first fluid may be similar, or roughly the same, so as to provide for evaluating the speed of the signal species through the second fluid. The distance travelled by the first and second signals transmitted through the first/second fluid may be the same so as to provide for evaluating the speed of the signal species through the second/first fluid.

In certain aspects, the method/apparatus may be for determining the speed of an acoustic signal, such as an ultrasonic signal. The method/apparatus may be for use with measurement of mediums, such as fluids and/or deposits, in the oil and gas production/exploration/transportation industry, such as in pipelines and/or tubings associated with oil and gas production/exploration.

According to a sixth aspect there is provided a computer program, provided, or providable, on a computer readable medium, the computer program configured to provide the method according to the first, third, and/or fifth aspect.

According to a seventh aspect of the invention, there is provided a method for determining the speed of a signal species in a medium, the method comprising:
using a time of receipt of a first signal having been received across a first distance in a medium and a time of receipt of a second signal having been received across a second distance in the medium, together with a known distance in order to determine the speed of the signal species through the medium, the first signal and second signal being of the same signal species and the first distance and second distance differing by the known distance.

The time of receipt of the first signal may be associated with the time of flight of the first signal. The time of receipt of the second signal may be associated with the time of flight of the second signal. For example, the time of flight of the first/second signal may determinable, or determined, from the time of receipt of the first/second signal. The time of receipt of the first/second signal may be the time of flight of the first/second signal.

The time of receipt of the first signal may be used together with the time of receipt of the second signal in order to provide for a difference in time of receipt. For example, the difference in time of receipt may be difference in the time at which the first signal is received and the second signal is received. The time of receipt of the first signal may be used together with the time of receipt of the second signal in order to provide a difference in time of flight of the first and second signals (e.g. a difference in time of flight of the first and second signals having been received across the first and second distances). The difference in time of flight, and/or the difference in time of receipt, may be considered to be associated with the time of flight of a signal species travelling across the known distance. The difference in time of flight, and/or the difference in time of receipt, may be considered to be the time of flight of a signal species travelling across the known distance.

The known distance may be used with the difference in time of flight, and/or difference in time of receipt, in order to determine the speed of the signal species in the medium. The known distance may be divided by the difference in time of flight, and/or difference in time of receipt, in order to determine the speed of the signal species in the medium.

The known distance may be associated with the relative distance between receipt of the first and second signals. The known distance may be the relative distance between receipt of the first and second signals. For example, the known distance may be associated with the relative distance between a first and second receiver having received the first and second signals, respectively. The known distance may be the relative distance between a first and second receiver.

The known distance may be an approximate distance, a guessed distance, a measured distance, a determined distance, a configured distance, or the like. For example, the distance between a first and second receiver may be configured, such as configured to be a precise distance. The known distance may equally be approximated based on the configuration of a first and second receiver, or may be guessed, etc.

The first and/or second distance may be unknown. The first and/or second distance may be approximately known, guessed, configured, or the like.

The method may comprise receiving the first and/or second signal. The method may comprise using a first and/or second receiver to receive the first and/or second signal. The first and second receiver may be configured such that they provide the known distance. For example, the first and second receiver may be configured/arranged at a known distance with respect to one another. The first and second receiver may be positioned at a known distance with respect to one another. The known distance may be determinable, or determined, based on the configuration of the first and second receiver. For example, the known distance may be different for different configurations of first and second receivers.

The method may comprise transmitting the first and second signal (e.g. by using one or more transmitters, such as a first and second transmitter). The first and second signal may be transmitted across the first and second distances in the medium. The first and second signal may be transmitted and reflected across the first and second distances in the medium (e.g. reflected from an object, or target, for example an object at a distance to the location of transmission). The distance to the object or target may be unknown. The distance to the object or target may be approximated, or guessed, or the like.

The method may comprise transmitting the first and second signal such that they are identifiable, such as uniquely identifiable (e.g. being modulated, or of a unique frequency, or the like). The method may comprise transmitting a common signal (e.g. a single signal) for subsequent receipt as the first and second signal. For example, the method may comprise transmitting a signal for receipt at a first receiver, and subsequent receipt at a second receiver; the distance between the first and second receivers being associated with the known distance (e.g. being the known distance).

The method may comprise using at least one of the first and second receivers as a transmitter for transmitting at least one of the first and second signal (e.g. using transceivers). The method may comprise using first receiver to transmit the first signal, and the second receiver to transmit the second signal. The method may comprise using the first receiver to transmit the first and second signals. The method may comprise using the second receiver to transmit the first and second signals.

The first and second signals may be transmitted and/or received simultaneously, or substantially simultaneously. The first and second signals may be transmitted and/or received sequentially, or substantially sequentially.

The medium may be a multi-layer medium, or a multi-phase medium. That is to say that the first and/or second distances may be across one of more phases/layers. Determining the speed of a signal species in the medium may provide determining the speed of a signal species in the medium providing the known distance (e.g. the medium between the first and second receiver, which may be irrespective of whether or not the medium across which the first and second signals were received was multi-layered, multi-phase, etc.).

The medium may comprise any one or combination of: solid, liquid and/or gas component phase. The medium may comprise a first layer, second layer, third layer, etc. One, some, or all layers may comprise any one, or more, of: solid, liquid or gas component phases. One, some, or all layers may comprise a single component phase. One, some, or all layers may comprise multiple component phases. Each layer may comprise different or the same component phases. One, some, or all layers may comprise water, oil, hydrocarbon gas, hydrates, asphaltenes, etc.

Two or more layers may be adjacent, such as being adjacently stratified, or the like. Two or more layers may be provided with a region of emulsion, foam, etc.

The signal species may comprise acoustic signals, electromagnetic signals, or the like. The method may be for use when determining the speed of a signal species in oil and/or gas. The method may comprise using the determined speed of the signal species for further analysis, or evaluation, of the medium. For example, the method may further comprise determining the medium (e.g. determining that the medium is gas, such as a hydrocarbon gas, rather than water, or the like), and/or the temperature of the medium by using the determined speed of the signal species. The method may comprise calibration, and/or the method may be used for calibration, such as calibration of further apparatus.

The method may comprise using the determined speed of a signal species together with the time of receipt of the first and/or second signal (or a further signal) to determine the first and/or second distances. The method may comprise using the speed of a signal species together with the time of flight of the first and/or second signal (or a further signal) to determine the distance to of the first and/or second distances.

According to an eighth aspect of the invention, there is provided apparatus for determining the speed of a signal species in a medium, the apparatus configured to use a time of receipt of a first signal having been received across a first distance in a medium and a time of receipt of a second signal having been received across a second distance in a medium, together with a known distance in order to determine the speed of a signal species through a medium, such a first signal and second signal being of the same signal species, and such a first distance and second distance differing by the known distance.

The apparatus may comprise a first receiver for receiving a first signal. The apparatus may comprise a second receiver for receiving a second signal. The first receiver and second receiver may be configured so as to provide the known distance. For example, the first receiver may be configured with respect to the second receiver, such as configuring the first receiver with respect to the second receiver so that the first/second signal travels further than the second/first signal. The further distance travelled may be the known distance.

The apparatus may further comprise one or more transmitters for transmitting the first and/or second signal. The apparatus may comprise a first transmitter for transmitting a first signal, and a second transmitter for transmitting a second signal. The apparatus may comprise a common transmitter for transmitting a first and second signal. For example, the transmitter may be configured to provide a common signal as a first and second signal. The first and/or second receiver may be configured as a transmitter (e.g. a transceiver). The, or each, transceiver may be configured to transmit a first and/or second signal and receive a first and/or second signal (e.g. a reflected signal).

The first receiver, second receiver and transmitter(s) may be configured, such as being configured with respect to one another, so as to provide the known distance.

The apparatus may be for use, or configured for use, in an oil and gas environment. The apparatus may be for use in a pipeline. The apparatus may be configured for use with a flowmeter. The apparatus may be configured for being comprised with a further apparatus. The apparatus may be hand held.

The apparatus may be configured to use the determined speed of a signal species together with a time of receipt of a first and/or second signal (or a further signal) to determine a first and/or second distances. The apparatus may be configured to use the determined speed of a signal species together with a time of flight of a first and/or second signal (or a further signal) to determine a first and/or second distances.

According to a ninth aspect there is provided an oil and gas device comprising the apparatus according to the eighth aspect. The device may be a flowmeter.

According to a tenth aspect there is provided a computer program, provided, or providable, on a computer readable medium, the computer program configured to provide the method according to the seventh aspect.

In certain aspects, the method/apparatus may be for determining the speed of an acoustic signal, such as an ultrasonic signal. The method/apparatus may be for use with measurement of mediums, such as fluids and/or deposits, in the oil and gas production/exploration/transportation industry, such as in pipelines and/or tubings associated with oil and gas production/exploration.

The invention includes one or more corresponding aspects, embodiments or features in isolation or in various combinations with of aspects whether or not specifically stated (including claimed) in that combination or in isolation. For example, features of the first aspect may be equally applicable with the seventh aspect, and vice versa.

It will be appreciated that one or more embodiments/features/aspects may be useful in determining the speed of a signal species in a medium, such as a multi-layered medium.

The above summary is intended to be merely exemplary and non-limiting.

BRIEF DESCRIPTION OF THE FIGURES

These and other aspects of the invention will now be described, by way of example only, with reference to the accompanying drawings, in which:

FIG. 1 shows an exemplary embodiment, comprising a conduit, and apparatus for determining the speed of a signal species in at least one of a first and second layer in a multi-layer medium;

FIG. 2 shows a further embodiment, comprising a conduit, and apparatus for determining the speed of a signal species in a first/second layer;

FIG. 3 shows a further embodiment, comprising a conduit, of apparatus for determining the speed of a signal species in a first/second layer;

FIG. 4 shows a further embodiment, comprising a conduit, of apparatus for determining the speed of a signal species in a first/second layer using reflected signals;

FIG. 5 shows a further embodiment, comprising a conduit, of apparatus for determining the speed of a signal species in a first/second layer;

FIG. 6 shows further exemplary embodiments, where layers of a multi-layer medium have sub-layers;

FIG. 7 shows a cross-section of a conduit/pipeline comprised with apparatus as described;

FIG. 8 shows a further embodiment of apparatus for determining the speed of a signal species in a first/second layer;

FIG. 10 shows an exemplary embodiment of apparatus for determining the speed of signal species in a medium.

DETAILED DESCRIPTION OF THE FIGURES

Figure 9:
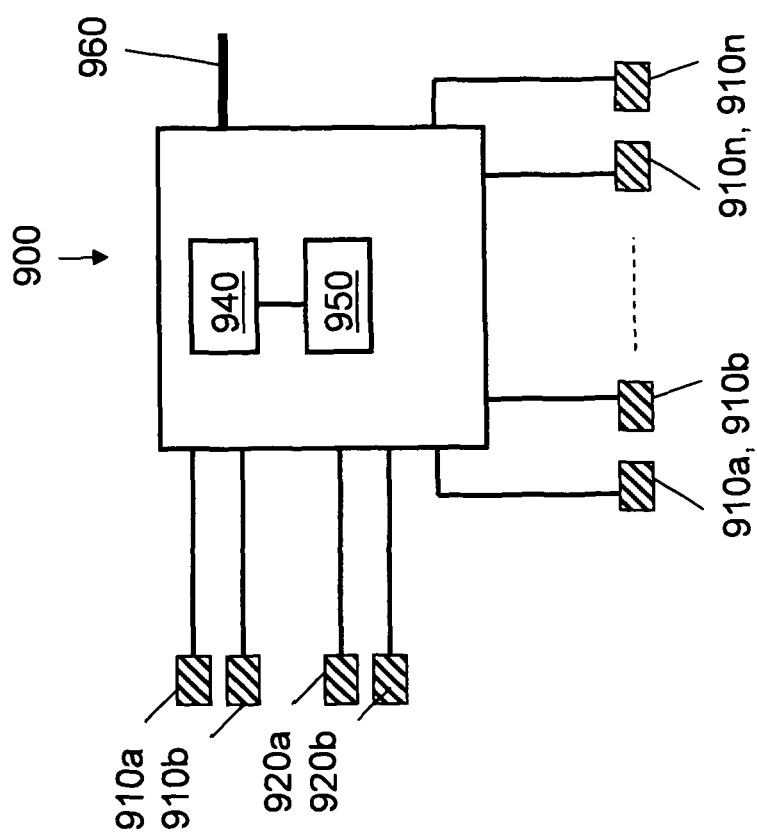
FIG. 9 shows an exemplary embodiment of apparatus for use with the above exemplary embodiments.

FIG. 1 shows a section of an exemplary conduit 100, comprising a multi-layer medium having a first layer 110 and a second layer 120. Here, the first layer 110 is adjacent the second layer 120 by means of an interface 115. The conduit 100 is provided in a horizontal configuration, such that the first layer 110 rests on the second layer 120. Here, the first layer 110 is a liquid hydrocarbon, such as oil, while the second layer 120 is water. Alternatively, the first and/or second layer may be any liquid, gas or solid (e.g. the first layer 110 may be a mixture water and oil in an emulsion, while the second layer may be asphaltene, such as an asphaltene deposit, or the like).

Here, the first layer 110 is a first fluid, and the second layer 120 is a second fluid. In this example, the first layer 110 and the second layer 120 each have a flow rate in a particular direction, and can be considered to have a laminar flow.

The conduit 100 shown in FIG. 1 is provided with a first known distance. The first known distance is the cross-sectional distance, 'D'. The conduit 100 comprises a recess 150 having an effective distance, 'd', so as to provide a second known distance of the conduit 100. The second known distance is the second cross-sectional distance, 'D+d'. That is to say that the second cross-sectional distance differs from the first cross-sectional distance by, 'd'. Here, 'd' is comprised with the first layer 110.

The height, or so-called hold-up, of the first layer 110 at the first known distance can be considered to be 'h'. The height, or so-called hold-up, of the second layer 120 at the first known distance can be considered to be 'D−h'.

The height of the first layer 110 at the second known distance can be considered to be 'h+d', while the height of the second layer 120 at the second known distance can be considered again to be 'D−h'.

FIG. 1 further shows apparatus 200 according to an embodiment of the invention. The apparatus 200 comprises a first transmitter 210a and a first receiver 210b. The first transmitter 210a and first receiver 210b are configured to transmit and receive respectively a first signal of a particular signal species across the first known distance, D, of the conduit 100. The apparatus 200 is configured such that the first signal passes initially through the first layer 110, and then through the second layer 120 in order to reach the first receiver 210b.

The apparatus 200 further comprises a second transmitter 220a and a second receiver 220b. The second transmitter 210a and second receiver 210b are configured to transmit and receive respectively a second signal of the same signal species across the second known distance, D+d, of the conduit 100. Here, the second transmitter 220a is in communication with the recess 150 so as to communicate the second signal initially through the first layer 110, then through the second layer 120 so as to reach the second receiver 220b.

Each transmitter 210a, 220a and receiver 210b, 220b is configured to transmit and receiver ultrasonic signal species. Here, the apparatus 200 is configured to emit and receive uniquely identifiable ultrasonic signals so that there is the reduced chance of crosstalk between non-corresponding transmitters/receivers. The identifiable signals have a unique modulation so as to be uniquely identifiable, such as a unique amplitude modulation. The apparatus 200 is configured to evaluate the time of flight of a first and second signal travelling across the first and second known distances (see later exemplary discussion in relation to FIG. 9). In the present embodiment, the first and second signals are transmitted simultaneously.

Here, the apparatus 200 is configured to be mountable/demountable with the conduit 100, but in alternative configurations the apparatus 200 may be comprised with the conduit 100, or portion of the conduit, or the like.

It will be appreciated that the time of flight of the first signal travelling across the first known distance can be considered to be the cumulative time of flight of the first signal passing through the first layer 110, and then the second layer 120. This can be represented algebraically by the following:

$$t_1 = t_o + t_w \tag{1}$$

where $t_1$ is the cumulative time of flight of a first signal passing through the first layer 110 and through the second layer 120, $(t_o + t_w)$. Assuming an average velocity or speed of signal species in each layer 110, 120, the cumulative time of flight can be considered as:

$$t_1 = \frac{h}{V_o} + \frac{(D-h)}{V_w} \tag{2}$$

where $V_o$ and $V_w$ are the speed of the signal species in the first layer 110 and the second layer 120 respectively. These values are unknown and to be established.

In a similar manner, the cumulative time of flight of a second signal passing through the first layer 110, and then the second layer 120 can be considered to be:

$$t_2 = \frac{d+h}{V_o} + \frac{(D-h)}{V_w} \tag{3}$$

It will be readily appreciated that the above expressions apply whether or not the respective signals pass initially through the first layer 110, then through the second layer 120, or whether they pass initially through the second layer 120, then through the first layer 110; the time of flight remains the same.

By subtracting (3) from (2), the speed of sound of the signal species in the first layer 110 can be obtained, as will be exemplified by the following:

Consider the situation when:
D=101.6 mm, and
d=2.0 mm,

Therefore, the first known distance and the second known distance can be determined. Assuming:

$t_1 = 70.656\ \mu s$, and $t_2 = 72.074\ \mu s$.

$t_2 - t_1 = 72.074\ \mu s - 70.656\ \mu s = 1.418\ \mu s$

Therefore, $$1.418 = \left[\frac{d+h}{V_o} + \frac{(D-h)}{V_w}\right] - \left[\frac{h}{V_o} + \frac{(D-h)}{V_w}\right]$$

$$1.418 = \frac{d+h}{V_o} + \frac{(D-h)}{V_w} - \frac{h}{V_o} - \frac{(D-h)}{V_w}$$

$$1.418 = \frac{d+h}{V_o} - \frac{h}{V_o}$$

$$1.418 V_o = d + h - h$$

$$V_o = \frac{d}{1.418} = \frac{2\ \text{mm}}{1.418\ \mu s} = 1410\ \text{m/s}$$

By evaluating accurately the speed of sound of a signal species in the first layer 110, further measurements can then be made of the first layer 110. The speed of the signal species may be considered to be the static velocity of a signal species in that layer in a multi-layered medium. It is noted that in the above example, it is not necessary that the specific hold-up 'h' of the first layer 110 be known in order to determine the speed of the signal species.

FIG. 2 shows a further embodiment of the invention, showing a further section of conduit 100, comprising the first layer 110 and the second layer 120, in a similar manner to that described above.

Again, the conduit 100 is provided with a first known distance, 'D', and a second known distance, 'D+d'. However, 'd' is provided by the cross-sectional distance of a recess 250, comprised, in this embodiment, with the second layer 120.

For the following analysis, in this embodiment the height of the second layer 120 at the first known distance can be considered to be 'h', while the height of the first layer 110 at the first known distance can be considered to be 'D−h', and the height of the second layer 120 at the second known distance can be considered 'h+d', and the height of the first layer 110 at the second known distance can be considered 'D−h'. As a result, a similar analysis can be performed as described above to derive the speed of a signal species in the second layer 120.

Apparatus 300 comprises a first transmitter 320a, first receiver 320b, second transmitter 330a, and second receiver 330b in a similar manner to that described above.

The following expressions are applicable:

$$t_1 = \frac{(D-h)}{V_o} + \frac{h}{V_w} \tag{4}$$

$$t_2 = \frac{(D-h)}{V_o} + \frac{d+h}{V_w} \tag{5}$$

Consider the situation when:
D=101.6 mm, and
d=2.0 mm,

Thus, the first known distance and the second known distance can be determined, and:
$t_1 = 70.656\ \mu s$, and
$t_2 = 72.035\ \mu s$.

It will readily be noted that in this instance $t_1$ is the same as that above, because the same signal has been passed through the same layer, while $t_2$ differs due to the fact that the recess 250 contains the material of the second layer 120 rather than the first layer 110.

$t_2 - t_1 = 72.035\ \mu s - 70.656\ \mu s = 1.379\ \mu s$

Therefore, $$1.379 = \left[\frac{(D-h)}{V_o} + \frac{d+h}{V_w}\right] - \left[\frac{(D-h)}{V_o} + \frac{h}{V_w}\right]$$

$$1.379 = \frac{(D-h)}{V_o} + \frac{d+h}{V_w} - \frac{(D-h)}{V_o} - \frac{h}{V_w}$$

$$1.379 V_w = d + h - h$$

$$V_w = \frac{d}{1.379} = \frac{2 \text{ mm}}{1.379 \text{ }\mu s} = 1450 \text{ m/s}$$

It will readily be appreciated that a combination of apparatus 200, 300 shown in FIGS. 1 and 2 provides for evaluating both the speed of a signal species in the first layer, $V_o$, and the speed of a signal species in the second layer, $V_w$.

Because $t_1$ is measured across the same distance, there is no requirement to provide a duplication of transmitter/receiver when combining the apparatus 200, 300 of FIGS. 1 and 2. FIG. 3 therefore shows a combined configuration of apparatus 200, 300, which in this exemplary embodiment are provided for use with a conduit 100. Here, the first signal, second signal and third signal are transmitted simultaneously, each of which is uniquely identifiable (such as uniquely identifiable by using unique amplitude modulation). The time of flight of the first signal and the time of flight of the second signal can be used to evaluate the speed of a signal in the first layer 110, while the time of flight of the first signal and the time of flight of the third signal can be used to evaluate the speed of a signal in the second layer. In this case, there is provided a first, second, and third known distance.

In the above embodiments, the speed of the signal species may be used to determine the material, or further material properties, of a particular layer 110, 120.

For example, the apparatus 200, 300 may be further configured to identify that the speed of an acoustic signal propagating in the first layer is roughly 300 m/s, and that, as a result, the first layer 110 is a hydrocarbon gas, rather than oil (e.g. by using look-up tables, and/or noting that oil has a far greater speed of sound). Additionally/alternatively, by having knowledge of the particular material of a particular layer (e.g. having determined that the first layer 110 is a hydrocarbon gas), it is possible to determine further material characteristics such as determining the temperature and/or density by using the evaluated speed of a signal species in that layer (e.g. again, by using look-up tables, or equations of state, etc.).

It will be appreciated that while in some embodiments the recess 150, 250 might be comprised with a conduit 100 (as above), in other embodiments that need not be the case. The recess 150 may be provided by an additional element, configured to be placed on the conduit. In such cases, the recess may comprise a material similar (or the same) as the particular layer 110 (e.g. comprising oil, gas, or the like). In some cases, the recess 150 is provided by an attachable/detachable recess element, having a containing portion for containing layer material (e.g. oil, gas, etc.) and configured to provide, when on the conduit, the second known distance. In such cases, the thickness of the walls of such a recess element, and/or conduit can be configured to be insignificant with respect to the second known distance, or the apparatus 200, 300 can be configured to compensate for the wall thickness (e.g. by having a prior knowledge of the thickness of the walls as the speed of a signal species through those walls).

It will readily be appreciated that the recess 150, 250 may be provided by a region of differing cross-section of an existing conduit, or pipeline, and may be provided such that the second known distance is larger, or smaller, than the second known distance, as will be apparent. The recess 150, 250 may be configured by casting, and/or machining, or the like.

It will also be readily appreciated that while in the above embodiments, 'd' is taken to be the same in the second and third known distances, that in other embodiments that need not be the case. For example, in some embodiments the distance provided by 'd' may differ. In some embodiments, 'd' may be selected dependent upon the layer with which the particular recess 150, 250 is to be in communication.

FIG. 4 shows a further embodiment of a conduit 100, comprising the first layer 110 and the second layer 120, and a recess 150, in a similar manner to that described in relation to FIG. 1. The conduit 100 is further provided with apparatus 400 for determining the speed of a signal species in the first layer 110.

In this embodiment, the apparatus 400 comprises a first transceiver 410 configured to transmit a first signal across the distance, D, of the conduit 100, and to receive a reflected first signal, reflected from the other side of the conduit 100. That is to say that the first signal passes twice through the first layer 110 and second layer 120, and travels a distance of 2×D. In effect, the first known distance can be considered to be 2×D.

The apparatus 400 further comprises a second transceiver 420, configured to transmit a second signal across D+d, of the conduit 100, and receive a reflected second signal, reflected from the other side of the conduit 100. That is to say that the second signal passes twice through the first layer 110, second layer 120, and recess, and travels a distance of 2×(D+d). In effect, the second known distance can be considered to be 2×(D+d).

Following the similar analysis to above, it can be shown that:

$$V_o = \frac{2d}{t_2 - t_1} \quad (6)$$

Following the above example, a skilled reader will readily be able to implement a similar configuration of FIGS. 2 and 3 by using transceiver(s) for reflected signals, rather, or in addition to, transmitters/receivers.

FIG. 5a shows a further embodiment in which the conduit 100, comprising the multi-layered medium having the first layer 110 and the second layer 120 is provided with a first recess 350a, second recess 350b, and a third recess 350c. The second recess 350b opposes the third recess 350c.

Here, the conduit 100 is provided with apparatus 500 for determining the speed of a signal species in the first layer 110 and the second layer 120. The apparatus 500 comprises a first transmitter 510a, first receiver 510b, second transmitter 520a and second receiver 520b, configured in a similar manner to that described in relation to FIG. 1 (i.e. transmit and receive first and second signals across first and second known distances through the first and second layers 110, 120).

That is to say that the first transmitter/receiver 510a, 510b is configured to transmit/receive a first signal across the first known distance, D, of the conduit 100, while the second transmitter/receiver 520a, 520b is configured to transmit/receive a second signal across the second known distance, D+d, of the conduit 100, which includes the cross sectional distance of the conduit and the cross-sectional distance of the first recess 350a.

The apparatus 500 further comprises a third transmitter 530a, and third receiver 530b configured to transmit/receive a third signal across a third known distance, D+2d, of the conduit 100, which includes the cross sectional distance of the conduit, 'D' and the cross-sectional distance of the second recess 350b and the third recess 350c.

The following expressions can be established for the time of flight of respective signals being communicated between respective transmitters/receivers, where 'h' is the height of the first layer 110:

$$t_1 = \frac{h}{V_o} + \frac{(D-h)}{V_w} \quad (7)$$

$$t_2 = \frac{d+h}{V_o} + \frac{(D-h)}{V_w} \quad (8)$$

$$t_3 = \frac{d+h}{V_o} + \frac{(D-h+d)}{V_w} \quad (9)$$

It will be noted that equations (7) and (8) are the same as equations (2) and (3). Therefore, in a similar manner to that described above, subtracting (7) from (8) provides for $V_o$.

To determine the speed of a signal species in the second layer 120, equation (8) is subtracted from equation (9) as follows:

$$t_3 - t_s = \left[\frac{d+h}{V_o} + \frac{(D-h+d)}{V_w}\right] - \left[\frac{d+h}{V_o} + \frac{(D-h)}{V_w}\right] \quad (10)$$

$$t_3 - t_s = \frac{d+h}{V_o} + \frac{(D-h+d)}{V_w} - \frac{d+h}{V_o} - \frac{(D-h)}{V_w}$$

$$V_w = \frac{d}{(t_3 - t_s)}$$

A skilled reader will readily appreciate that the embodiment shown in FIG. 5a may be use to simultaneously assess the speed of signals in the first layer 110 and second layer 120.

FIG. 5b shows a further embodiment of that shown in FIG. 5a, in which two recesses 350b, 350c have been provided by a common recess 350d.

FIG. 6a shows a further embodiment of a conduit 600, in which the conduit 600 is provided by a chamber 600, such as a container, barrel, drum, or the like (although this is exemplary, and the conduit may be a pipeline, reservoir, etc.). The chamber 600 contains a first layer 710 and a second layer 720 in a similar manner to that described above. However, in this embodiment, the second layer 720 has two sub-layers 720a, 720b, which are separated by a second interface layer 715. In a similar manner to that described above, the speed of a signal species in the first layer 710 may be evaluated. That is to say, that the speed of a signal species in the sub-layers 720a, 720b, may be considered to be an average speed of signal in the second layer 720. The time of flight of a signal passing through the sub-layer can be considered to be a cumulative average.

FIG. 6b shows an embodiment of the conduit 600 in which the lower sub-layer 720a is a deposit of material, such as a hydrate, asphaltene, etc. In some embodiments, the second layer 720 may be entirely, or substantially, provided by a deposit. Similar deposits may be formed/measured in the above exemplary conduit 100.

FIG. 7a shows a cross section of an exemplary conduit as a tubular pipeline 10, in which the pipeline 10 extends into the page. The pipeline 10 comprises a multi-layer medium having the first layer 110, second layer 120 and interface 115. Here, as indicated by arrows 20, 30, show the relative positions of the respective transmitters/receivers as exemplified above so as to determine the speed of a signal species in at least one of the first layer 110 and second layer 120. For clarity, any recesses 150, 250, 350a-d are not shown in FIG. 7. Here, the relative positions of the transmitters/receivers as indicated by arrows 20, 30 are shown as being roughly perpendicular to the plane of the interface 115.

However, in alternative embodiments, that need not be the case, and in some embodiments, the relative positions of the transmitters/receivers can be provided such that they are not perpendicular to the plane of the interface 115. As will be appreciated by the skilled reader, in such an arrangement, the speed of the signal species still may be determined.

FIG. 7b show a configuration having a plurality of apparatus 50a-50c for determining the speed of a signal species at a plurality of locations around a pipeline. In some configurations, the plurality of apparatus 50a-50c may be configured to operate individually, or cumulatively, in order to determine the speed of signal species. For example, the average, or mean, speed of signal species may be derived from a plurality of apparatus, each configured at different locations on a conduit/pipeline (e.g. different locations around a pipeline).

FIG. 8 shows a further embodiment of the invention, comprising apparatus 800 in a similar configuration to that described in relation to FIG. 1, whereby the apparatus 800 is immersed in a multi-layered medium having the first layer 110, second layer 120, and interface 115. Here, the apparatus 800 is provided such that it is not comprised with a conduit or the like, but is provided with locators 810, configured such that the apparatus 800 can be located in a medium, so as to transmit a first and second signal through the first and second layers.

Here, the apparatus is immersed in a reservoir comprising the multi-layer medium, but in alternative configurations that apparatus may be for use in a conduit, in the like. The locators 810 may be configured such that the apparatus can be embedded in deposits, or located in liquid/gas, such as flowing liquid/gas, as will be appreciated.

A similar configuration may be provided in relation to any of the further apparatus described above. For example, the configuration of FIG. 3, 4 or 5 may be provided with locators 810, rather than being provided with a conduit. In addition, the apparatus 800 may provided in a similar manner to that shown in FIG. 7a or 7b.

FIG. 9 shows an exemplary apparatus 900 similar to the apparatus 200, 300, 400, 800 described above, comprising a plurality of transmitters/receivers 910a-910n, 920a-920n for use with conduit 100, 600, and/or locators 810. Again, each of the transmitters/receivers are configured to transmit/receive a signal across a first/second layer. It will be appreciated that the apparatus 900 may be configured with 2, 3, 4, 5, 10, 20 or more transmitters/receivers, or any number therebetween.

Here, the apparatus 900 further comprises a remote controller 930 comprising a processor 940 and a memory 950, the processor 940 and memory 950 being configured in a known manner. The processor/memory 940, 950 may be provided by a microcontroller, such that provided by a field programmable gate array, application specific integrated circuit, programmable intelligent computer, or the like. Here, the controller 930 is configured to operate the transmitter/receivers to as to provide the various signals. The controller 930 is further configured to determine the time of flight of such respective signals, and evaluate the speed of signal(s).

By being remote, the controller 930 is configured to communicate with the transmitters/receiver from a distance (i.e. not located at a multi-layer medium). In this embodiment, the controller 930 is configured to communicate with the respective transmitters/receivers by wired communication, but in alternative embodiments, the controller may be configured to communicate with the transmitters/receivers by wireless, optical, acoustic (i.e. using the layer in the conduit as a vehicle for signals) or any combination thereof.

The controller 930 is configured to provide an output 960. The output 960 is configured to providing further apparatus, such as measuring apparatus, with data/information in relation to the speed of signal(s) species in particular layer(s). In some embodiments, the output 960 is configured to be in communication with a multiphase flow meter. Alternatively, the controller 930 and output 960 are comprised with a multiphase flow meter.

FIG. 10a shows a further exemplary conduit 100 comprising a medium 30. The medium 30 may be solid, liquid or gas, or the like. In the present embodiment, the medium is a liquid, such as water. Here, the conduit 100 is provided with apparatus 40 for determined the speed of a signal species in the medium. FIG. 10a shows the apparatus 40 comprised with the conduit 100, but in alternative embodiments that need not be the case (e.g. the apparatus 40 may be configured to attach to, or couple with the conduit 100, etc.).

The apparatus 40 is configured with the conduit 100 such that signals are able to be communicated to the medium 30 in the conduit 100. Here, the apparatus 40 comprises a first transmitter 10a and a first receiver 10b. The first transmitter 10a and first receiver 10b are configured to transmit a first signal of a particular signal species across a first known distance, D.

The apparatus 40 further comprises a second transmitter 20a and a second receiver 20b. The second transmitter 20a and second receiver 20b are configured to transmit a second signal of the same signal species across a second known distance, D+d. In this example, the second known distance differs from the first known distance by the known distance, d (in a similar manner to that described above). In this case, the distance d can be considered to be representative of the relative difference in distances between the first and second transmitters 10a, 20a. Of course, in alternative configurations, the apparatus 40 may be configured such that the distance d is representative of the relative difference in distances between the first and second receivers 10b, 20b (i.e. the first and second signals travel across the first known distance, D, and the second known distance, D+d, in the opposite direction.

Here, the signals transmitted may be of any species, such as electromagnetic, acoustic, or the like.

The time taken for a first signal to travel across the first known distance can be considered to be $t_1$. The time taken for a second signal to travel across the second known distance can be considered to be $t_2$. The speed of the signal species in the medium 30 (that is to say the velocity of the signals in each case) can be considered to be:

$$V_m = \frac{D}{t_1} = \frac{D+d}{t_2} \quad (11)$$

However, consider the situation when the known distance D is not known, or not known precisely. For example, consider that d is known to a great precision, but D is entirely unknown. In such circumstances, the invention permits advantageously permits the speed of the signal species in the medium 30 to still be determined.

This can be achieved by using the difference in the time of flight, or the difference in time of receipt, of the first and second signals.

The time of flight of the second signal passing across the known distance, d, can be considered to be:

$$t_d = t_2 - t_1 \quad (12)$$

The speed of the signal species can then be consider to be:

$$V_m = \frac{d}{t_d} \quad (13)$$

That is to say that the speed of the signals species can be determined without the need to know, or even have an approximation of, D. It will be readily appreciated that in the above example, when the time of receipt of the first and second signals can be used to determine the time of flight. Alternatively, only the difference in the time of receipt may be used.

Consider the embodiment shown in FIG. 10b in which there is shown a conduit 100 and a medium 30, and further comprising apparatus 45, configured with the conduit 100 in a similar manner to that described above. In this example, the apparatus 45 comprises a first transceiver 15 and a second transceiver 25.

The first transceiver 15 is configured to transmit a first signal of a particular signal species across a first distance, D, which is unknown. The transceiver is further configured to receive a reflected first signal. The second transceiver 25 is configured to transmit a second signal of the same signal species across a second distance, D+d, which is also unknown; and to receive a reflected second signal. In this case, the difference between the first and second distance is known. That is the distance, d. The accuracy of this known distance may be provided by configuring the first transceiver 15 with respect to the second transceiver 25, such as accurately configuring.

In a similar manner to that described above, the apparatus 45 is configured to determine the speed of the signal species in the medium 30 by using the difference between the times of flight/times of receipt of the first and second signals. In this case, the speed of the signal species can be considered to be:

$$V_m = \frac{2d}{t_d} \quad (14)$$

It will readily be appreciated that in some embodiments, the apparatus 45 may be configured such that only one of the first and second transceivers 15, 25 transmits a signal. That is to say that in some configurations, the first transceiver 15 can transmit the first and second signal (which may be the same, or common, signal). In such cases, the first and second transceiver 15, 25 is still configured to receive this signal to determine the speed of the signal species. However, in such cases, the speed of the signal species will be either:

$$V_m = \frac{d}{t_d} \text{ or } V_m = \frac{2d}{t_d} \quad (15)$$

depending on which transceiver 15, 25 is used to transmit the first/second signals. Of course, it will be appreciated that in such embodiments, only a first or second receiver may be used rather than a first or second transceiver.

Similarly, a skilled reader will readily appreciate that although the apparatus 40, 45 above has been described with reference to a conduit 100, that this is exemplary only. Consider the embodiment shown in FIG. 10c, in which there is shown an apparatus 47 comprising a first and second transceiver 17, 27. The first and second transceivers 17, 27 are configured such that they are associated with a difference in signal travel of 'd' (the known distance). Here, the apparatus 47 is configured for hand-held use.

In use, an operator may transmit a first and second signal from the apparatus 47. The signals may be transmitted simultaneously (e.g. using different frequencies to distinguish between signals, or the like), and/or may be transmitted sequentially. Furthermore, only one of the first and second transceivers 17, 27 may be configured to transmit the first/second signals, in a similar manner to that described above.

Of course, in some cases, one transceiver may be configured to transmit a common, or single signal as the first and second signal.

When the apparatus 47 receives the first/second signal having been reflected from an object, or target 12 (e.g. reflected at a change in material, change in impedance, or the like) it is configured to determine the speed of a signal species in the medium 30 to which the apparatus 47 is in communication by using the known distance, 'd'. It will be appreciated that in some instances, the distance to a further object or target 12 is inconsequential. That is to say that it is not important for determining the speed of a signal in the medium 30 to know, or have an approximation, or the like, or the distance to a further object or target 12. In this case, the speed of a signal species is still determinable.

It will readily be appreciated that in some configurations, the apparatus 47 need not be configured to transmit a signal (first and/or second signal). In such instances, the apparatus may be configured to receive signals and to determine the speed of a signal species (e.g. listen only mode). In such cases the speed of a signal species may be determined by using the difference in time between a signal being received at a first receiver, and a signal being received at a second receiver (e.g. being subsequently received at a second receiver).

FIG. 10d shows a further embodiment of apparatus 48, having first and second transceivers 18, 28. Here, the speed of a signal species is determinable by reflecting a first and second signal from the object or target 12. However, in this embodiment, the object or target is provided with the known distance, d. The object or target 12 may be provided in a complementary manner with the apparatus 48. That is to say that the object or target may be configured for use with the apparatus 48 (e.g. the apparatus may comprise the target 12).

FIG. 10e shows a further embodiment of apparatus 49, similar to that described in relation to FIG. 10d. Here, the apparatus 49 is provided with a single transceiver 19. Again, the object or target 12 is provided with the known distance. In use, the apparatus 48 is configured to common signal to the object or target 12. Upon reflection, the first and second signals are provided. These reflected signals are received at the apparatus for determining the speed of the signal species.

It will readily be appreciated that in the above embodiments, the object or target 12 may be an opposing wall or region of a conduit, a container, a reservoir or the like.

It will be appreciated that the apparatus 40, 45, 47, 48, 49 described, when used to determine the speed of a signal species in a medium 30, may be additionally configured to determine or provide for determining other characteristics of the medium. For example, if the speed of the signal species is determined to be 330 m/s rather than 3000 m/s, the medium 30 may be considered to be liquid, rather than gas. The type of material, and/or temperature may also be determinable.

In a similar manner, the apparatus 47, 48, 49 may be configured to determine the distance to one or more objects or targets by using the determined speed of a signal species (e.g. and the time of flight of one of the first and second signal).

A skilled reader will appreciate that the apparatus 40, 45, 47, 48, 49 may be provided with a controller, in a similar manner to that depicted in FIG. 9. In addition, in certain configurations a plurality of transmitters/receivers may be provided so as to allow a configuration similar to that described in relation to FIG. 7.

While in the above exemplary embodiments, the apparatus/conduit is consider to have a wall of negligible thickness, or that the transmitters/receivers are in (direct) communication with the respective layer, it will be appreciated by the skilled reader that wall thickness, such as pipe thickness may easily be accounted for in any of the above embodiments (e.g. when the transmitters/receivers are not in direct communication with the layer).

For instance, consider the embodiment of FIG. 1, in which the first and second signal must travel through a conduit wall thickness of 1 mm. In such a configuration, the signal (first, second, etc.) must pass through this wall thickness twice in order to be passed initially into the layer, then again when being passed into the receiver (irrespective of whether or not a reflected signal is used)

In such an arrangement, by having knowledge of the conduit wall construction, for example, steel, and the wall thickness, the time taken for the signal to travel across the wall can be approximated/evaluated accounted for in any subsequent evaluation. In some embodiments, a temperature sensor, such as a thermocouple, may be provided with the conduit in order to determine accurately the speed of a signal in the wall.

While in the above embodiments, layers such as oil and water have been described, it will readily be appreciated that the apparatus/method may be applicable for any layer, which may be a solid, liquid or a gas. For example, in some embodiments the apparatus may be configured to determine the speed of a signal in a combination of liquid and gas, such as oil and a hydrocarbon gas, or an emulsion of a number of fluids. In alternative embodiments, the apparatus may be configured to determine the speed of a signal in other layers in a conduit, such as coolants, or the like.

In addition, and in view of the foregoing description, it will be evident to a person skilled in the art that various modifications to any of the embodiments may be made within the scope of the invention. Similarly, the apparatus and/or methods disclosed may have other functions/steps, in addition to those described.

It will be appreciated to the skilled reader that the features of particular apparatus may be provided by apparatus arranged such that they become configured to carry out the desired operations only when enabled, e.g. switched on, or the like. In such cases, they may not necessarily have the appropriate software loaded into the active memory in the non-enabled state (e.g. switched off state) and only load the appropriate software in the enabled state (e.g. on state). The apparatus may comprise hardware circuitry and/or firmware. The apparatus may comprise software loaded onto memory. The apparatus may comprise a Field Programmable Gate Array, Application Specific Integrated Circuit, or the like. The apparatus may comprise electromagnetic transducers, acoustic transducers or the like.

Figure 11:
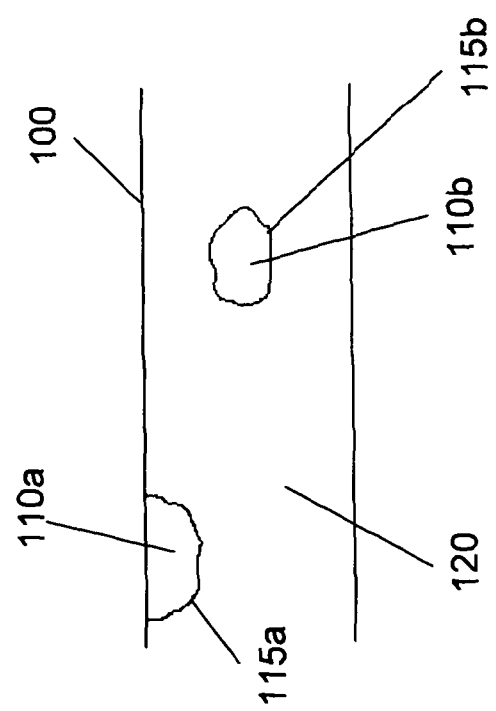
FIG. 11 is a diagrammatic representation of an arrangement of layers within a conduit.

In the above described exemplary embodiments the different layers are shown to be continuously stratified. However, in alternative arrangements, as illustrated in FIG. 11, a first layer 110a may be at least partially contained within a second layer 120 with an interface region 115a defined therebetween. Further, a first layer 110b may be entirely contained within a second layer 120 with an interface region 115b defined therebetween.

The present invention provides a robust method and apparatus for determining characteristics of a multi-layer medium while minimising complexities normally associated with known systems. For example, the present invention permits direct evaluation of the speed of a signal species within a multi-layer medium, which may then be used to ensure detailed accuracy of further analysis. This may permit processing time to be significantly reduced which may in turn permit greater sampling rates to be used. This may permit advantageous effect of the present invention for use in real-time evaluation of the medium, such as real time flow visualisation.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method for determining a speed of a signal species in at least one of a first and a second layer of a multi-layer medium, comprising:
   transmitting a first signal across a first known distance through the first and second layers;
   determining a time of flight of the first signal travelling across the first known distance;
   transmitting a second signal across a second known distance through the first and second layers, the second signal being of the same signal species as the first signal, and wherein the second known distance differs from the first known distance;
   determining a time of flight of the second signal travelling across the second known distance; and
   evaluating, using at least one processor, the speed of the signal species through at least one of the first and second layers by using the time of flight of the first and second signals and the first and second known distances.

2. The method according to claim 1, wherein the first and second layers are adjacent layers.

3. The method according to claim 1 wherein the distances travelled by the first and second signals through the second layer are roughly the same, so as to provide for evaluating the speed of the signal species through the first layer.

4. The method according to claim 1 wherein the distances travelled by the first and second signals through the first layer are roughly the same so as to provide for evaluating the speed of the signal species through the second layer.

5. The method according to claim 1, comprising transmitting a third signal across a third known distance through the first and second layers, the third signal being of the same signal species as the first and second signals, and wherein the third known distance differs from at least one of the first and second known distances, the method further comprising determining a time of flight of the third signal travelling across the third known distance so as provide for determining the speed of a signal species in at least one of a first and second layer of a multi-layer medium.

6. The method according to claim 5, wherein the distances travelled by at least two of the first, second and third signals through the second layer are roughly the same.

7. The method according to claim 5, wherein the distances travelled by at least two of the first, second and third signals through the first layer are roughly the same.

8. The method according to claim 5, wherein the first, second and third known distances are different.

9. The method according to claim 5 in which one or more of the first, second and third signals are transmitting or used twice in order to provide for evaluating the speed of a signal species.

10. The method according to claim 1 in which the multi-layer medium comprises phases comprising any one or combination of: solid, liquid and/or gas component phase.

11. The method according to claim 10, wherein the first layer and the second layer comprise different component phases.

12. The method according to claim 1, comprising providing one or more recesses so as to provide for different distances between the first and second known distances.

13. The method according to claim 1, in which one, some or all of the first and second signals are transmitted through or across a conduit, container, reservoir, or pipeline.

14. The method according to claim 1, wherein the signal species comprise acoustic signals.

15. Apparatus for determining a speed of a signal species in at least one of a first and a second layer of a multi-layer medium, comprising:
   a first transmitter and a first receiver, configured to transmit and receive a first signal across a first known distance through the first and second layers;
   a second transmitter and a second receiver, configured to transmit and receive a second signal across a second known distance through the first and second layers;
   the apparatus being configured to transmit and receive a second signal of the same signal species as the first signal, wherein the second known distance differs from the first known distance;
   the apparatus further configured to determine a time of flight of the first signal travelling across the first known distance and a time of flight of the second signal across the second known distance, and to evaluate the speed of a signal species through at least one of the first and second layers by using the time of flight of the first and second signals and the first and second known distances.

16. The apparatus according to claim 15, wherein the apparatus is configured such that the distances travelled by the first and second signals through the second layer are roughly the same so as to provide for evaluating the speed of the signal species through the first layer.

17. The apparatus according to claim 15 comprising a third transmitter and a third receiver, configured to transmit and receive a third signal across a third known distance through the first and second layers, the third signal being of the same signal species as the first and second signals, the apparatus configured to determine a time of flight of the third signal travelling across the third known distance.

18. The apparatus according to claim 17 in which the third known distance differs from at least one of the first and second known distances, such that the distances travelled by at least two of the first, second and third signals through the first or second layer are roughly the same.

19. The apparatus according to claim 15, wherein the apparatus comprises one or more recesses, the one or more recesses providing for different distances between the first and second known distances.

20. The apparatus according to claim 15, wherein the apparatus is configured for use with a pipeline.

21. A method for determining a speed of a signal species in a medium, the method comprising:
   using at least one processor to determine the speed of the signal species through the medium by using a time of receipt of a first signal having been received across a first distance in the medium and a time of receipt of a second signal having been received across a second distance in the medium, together with a fixed known distance in order to determine the speed of the signal species, the first signal and second signal being of the same signal species and the first distance and second distance differing by the fixed known distance.

22. A computer program, provided on a computer readable medium, the computer program configured to provide the method according to claim 1.

* * * * *